United States Patent
Chen et al.

(10) Patent No.: US 10,518,781 B2
(45) Date of Patent: Dec. 31, 2019

(54) POWERTRAIN WITH ANTI-SHUFFLE CONTROL

(71) Applicant: Ford Global Technologies, LLC, Dearborn, MI (US)

(72) Inventors: Weitian Chen, Windsor (CA); Zhengyu Dai, Canton, MI (US); Stuart Ford, Farmington Hills, MI (US); Todd McCullough, Bloomfield Hills, MI (US); Hong Jiang, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 142 days.

(21) Appl. No.: 15/926,441

(22) Filed: Mar. 20, 2018

(65) Prior Publication Data

US 2019/0291737 A1   Sep. 26, 2019

(51) Int. Cl.
*B60W 30/20* (2006.01)
*B60W 10/06* (2006.01)
*B60W 10/10* (2012.01)
*B60W 40/13* (2012.01)

(52) U.S. Cl.
CPC ............ *B60W 30/20* (2013.01); *B60W 10/06* (2013.01); *B60W 10/10* (2013.01); *B60W 2030/206* (2013.01); *B60W 2040/1361* (2013.01); *B60W 2400/00* (2013.01); *B60W 2510/0652* (2013.01); *B60W 2510/0661* (2013.01); *B60W 2510/102* (2013.01); *B60W 2510/1045* (2013.01); *B60W 2710/0666* (2013.01)

(58) Field of Classification Search
None
See application file for complete search history.

(56) References Cited

U.S. PATENT DOCUMENTS

| | | | |
|---|---|---|---|
| 6,193,628 B1 | 2/2001 | Hrovat et al. | |
| 6,314,342 B1 * | 11/2001 | Kramer | B60G 17/0195 180/197 |
| 7,775,089 B2 | 8/2010 | Suzuki et al. | |
| 8,528,388 B2 | 9/2013 | Yutani et al. | |
| 9,457,787 B2 | 10/2016 | Nefcy et al. | |
| 9,481,360 B1 | 11/2016 | Gibson et al. | |

(Continued)

FOREIGN PATENT DOCUMENTS

| | | |
|---|---|---|
| JP | 5091007 B2 | 12/2012 |
| WO | 2016110650 A1 | 7/2016 |

*Primary Examiner* — Timothy Hannon
(74) *Attorney, Agent, or Firm* — David Kelley; Brooks Kushman, P.C.

(57) ABSTRACT

Powertrains may include a spring damper between the engine crankshaft and transmission input shaft. In some circumstances, an oscillation known as shuffle may occur in such powertrains. Active adjustment of engine torque is substantially more effective at mitigating shuffle oscillations if the engine torque includes a p-term proportional to displacement of the damper spring in addition to a d-term proportional to the speed difference across the damper. For various reasons, the spring displacement is difficult to measure directly. An observer algorithm is utilized to calculate a current estimated spring displacement based on a crankshaft speed sensor, a transmission input speed sensor, a wheel speed sensor, and past engine torques, using a dynamic model of the powertrain.

17 Claims, 6 Drawing Sheets (56) References Cited

U.S. PATENT DOCUMENTS 9,566,984 B2 2/2017 Kuwamoto et al.
2012/0101705 A1* 4/2012 Templin ............... B60W 30/20
                                                                     701/99

* cited by examiner

POWERTRAIN WITH ANTI-SHUFFLE CONTROL

TECHNICAL FIELD

This disclosure relates to the field of control systems for vehicles having an automatic transmission. More particularly, the disclosure relates to a control strategy for controlling an engine to minimize a powertrain oscillation known as shuffle.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Some of the components in the power flow path between the engine and the wheels have some degree of torsional compliance. The components also have torsional moments of inertia. As a result, various oscillation modes are possible. In some cases, it is possible to adjust the compliance and inertia to ensure that the natural frequency is not excited by typical operations. In other cases, energy absorbing components, such as an open torque converter, prevent unpleasant oscillations. However, operating with energy absorbing components increases parasitic drag and reduces improve fuel economy

SUMMARY OF THE DISCLOSURE

A method of controlling a powertrain includes transferring power via a transmission, calculating an estimated current displacement of a damper spring, and adjusting engine torque based on the estimated current displacement of the spring to reduce a spring displacement oscillation. The transmission includes an input shaft coupled to an engine crankshaft via a damper and an output shaft driveably connected to vehicle wheels. The current displacement of the spring is estimated based on a time series of past measured rotational velocities of the engine crankshaft, the transmission input shaft, and the vehicle wheels, and a time series of past engine torque values. The method may also include calculating a rate of change of the spring and further adjusting the engine torque based on the derivative. The engine torque may also be adjusted based on a driver demanded torque and a derivative of the driver demanded torque.

A powertrain includes a gearbox and a controller. The gearbox has an input shaft connected to an engine crankshaft by a damper having a spring. The gearbox may also have an output shaft driveably connected to vehicle wheels. The controller is programmed to, based on a time series of past speed sensor readings and a time series of past engine torque values, command the engine to produce an engine torque that oscillates between 90 degrees and 180 out of phase with a displacement of the spring. The speed sensor readings may include: a sensed crankshaft speed reading, a sensed input shaft speed reading, and a sensed wheel speed reading. The controller may also calculate a current estimated spring displacement based on the time series of past speed sensor readings and the time series of past engine torque values. The controller may calculate a target engine torque command comprising a p-term proportional to the current estimated spring displacement, a d-term proportional to a speed difference between the engine crankshaft and the input shaft, and a feed forward term based on a driver demanded torque.

A powertrain includes a gearbox, a sensor array, and a controller. The gearbox has an input shaft connected to an engine crankshaft by a damper having a spring. The gearbox may also have an output shaft driveably connected to vehicle wheels. The sensor array does not include any sensors configured to measure spring displacement, but may include a crankshaft speed sensor, an input shaft speed sensor, and a wheel speed sensor. The controller is programmed to, based exclusively on readings from the sensor array and a time series of past engine torque values, command the engine to produce an engine torque that oscillates between 90 degrees and 180 out of phase with a displacement of the spring. The controller may also calculate a current estimated spring displacement based on the readings and the past engine torque values. The controller may calculate a target engine torque command comprising a p-term proportional to the current estimated spring displacement, a d-term proportional to a speed difference between the engine crankshaft and the input shaft, and a feed forward term based on a driver demanded torque.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
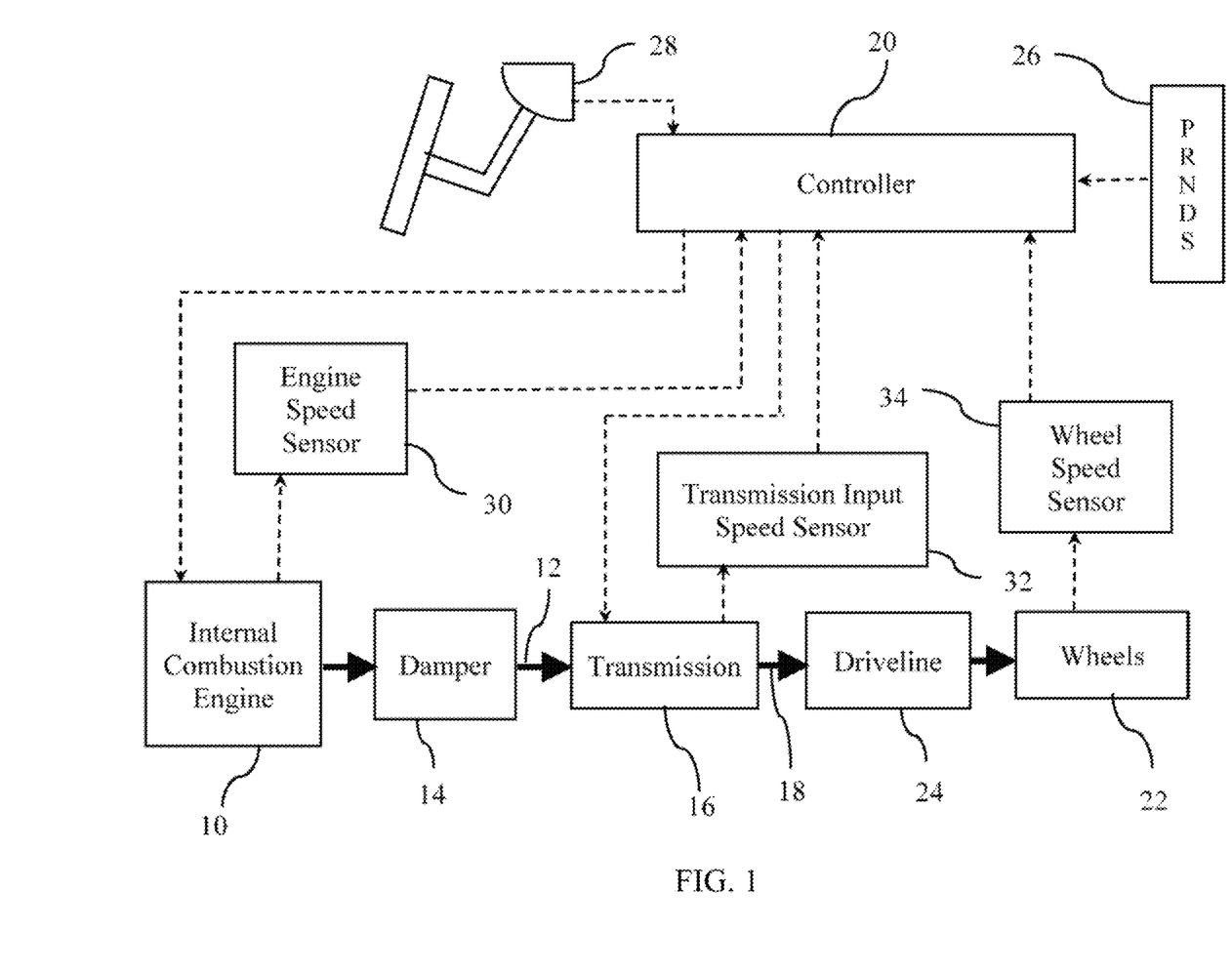
FIG. 1 is a schematic diagram of a vehicle powertrain.

An example vehicle powertrain is schematically illustrated in FIG. 1. The flow of mechanical power is indicated by bold solid lines. Dashed lines indicate the flow of information signals. Power is provided by internal combustion engine 10 which drives transmission input shaft 12 via damper 14. Damper 14 includes a torsional spring which permits some difference is rotational displacement between the crankshaft of engine 10 and transmission input shaft 12. Consequently, downstream components are at least partially shielded from the torque pulses from the discrete combustion events in the cylinders of internal combustion.

Transmission 16 transmits the power from transmission input shaft 12 to transmission output shaft 18 at a variety of speed ratios based on commands from controller 20. includes a torque converter 14 and a gearbox 16. Transmission 16 may include a gearbox configured to establish various speed ratios by selectively engaging clutches. When the clutches that establish a given speed ratio are fully engaged, the gearbox transmits and multiplies any input torque pulses to downstream components. Transmission 16 may also include a torque converter that transmits torque hydrodynamically based on a speed difference between an impeller and a turbine. When the torque converter is transmitting torque hydrodynamically, it also dissipates some of the power and further shields downstream components from engine pulses and dampens powertrain oscillations. The torque converter may also include a bypass clutch which, when engaged, transmits torque directly from the transmission input shaft to the gearbox input. When the bypass clutch is fully engaged, the torque converter transmits torque pulses and ceases to dampen powertrain oscillations. Some types of transmission do not include a torque converter.

Transmission output shaft 18 is driveably connected to the vehicle wheels 22 by driveline 24. Typically, driveline 22 includes fixed ratio final drive gearing and a differential which divides the power between left and right wheels while permitting slight speed differences. In a rear wheel drive powertrain, the driveline includes a driveshaft to transmit power from the transmission output shaft 18 to the differential. In a front wheel drive powertrain, power is typically transmitted from the transmission output shaft 18 to the differential input by gearing or a chain drive. Power is transmitted from the two differential outputs to the wheels by half-shafts. The driveshaft and half-shafts may have some rotational compliance.

Controller 20 controls the torque produced by engine 10 and the state of transmission 16 in response to various signals. A driver utilizes shift selector 26 to indicate whether he or she want to go forward, backwards, or remain stationary. The driver uses accelerator pedal 28 to indicate the amount of power desired. The controller also uses signals from three speed sensors: Engine crankshaft speed sensor 30, transmission input shaft speed sensor 32, and wheel speed sensor 34. These sensors may directly sense these speeds or may alternatively measure the speeds of other shafts whose speeds are directly proportional. The shaft that is directly measured must not, however, be separated from the specified shaft by a component with substantial compliance where substantial is in relation to the compliance of the damper spring of damper 14 or the driveline compliance.

Due to the inertia of the engine, transmission components, and the wheels and the compliance of the damper spring and the driveline, various oscillation modes are possible. This is particularly true when the torque converter is locked and thus not absorbing any power to dampen such oscillations. When the gearbox has established a speed ratio in which the transmission input rotates much faster than the transmission output, an oscillation mode known as shuffle is particularly difficult to control. The frequency of the shuffle mode is considerably lower than the firing frequency of the engine. A shuffle oscillation may be initiated by various perturbations, such as rapid engagement of the bypass clutch, a transmission shift, or a rapid change in engine torque.

One way to control shuffle oscillations is by varying the engine torque in opposition to the oscillation. Ideally, the average engine torque should closely follow the driver demanded torque such that the driver does not notice the anti-shuffle feature (other than not being annoyed by the presence of shuffle). The engine torque should vary around the driver demanded level at the frequency of the oscillation. The damping is most effective if the oscillatory torque component includes a term proportional to the rotational displacement of the damper spring and another term proportional to the derivative of the spring displacement of the damper spring. It is also helpful if the engine torque includes feed-forward terms calculated to anticipate and counteract and windup in the damper spring from changes in the driver demanded torque.

To include the proportional term, controller 20 must determine the current spring displacement. For several reasons, spring displacement is difficult to measure. Since the rotational positions of the crankshaft and the transmission input shaft change rapidly, position sensors would need very low latency in order to accurately determine spring displacement by simply calculating the position difference. Furthermore, in many transmissions, the transmission input shaft is difficult to reach with a sensor. The inventors have discovered an effective method for determining the spring displacement using three speed sensors which are commonly found in powertrains for other reasons. This method uses a software based observer to accurately estimate the spring displacement based on a dynamic system model and a time series of readily available inputs.

Figure 2:
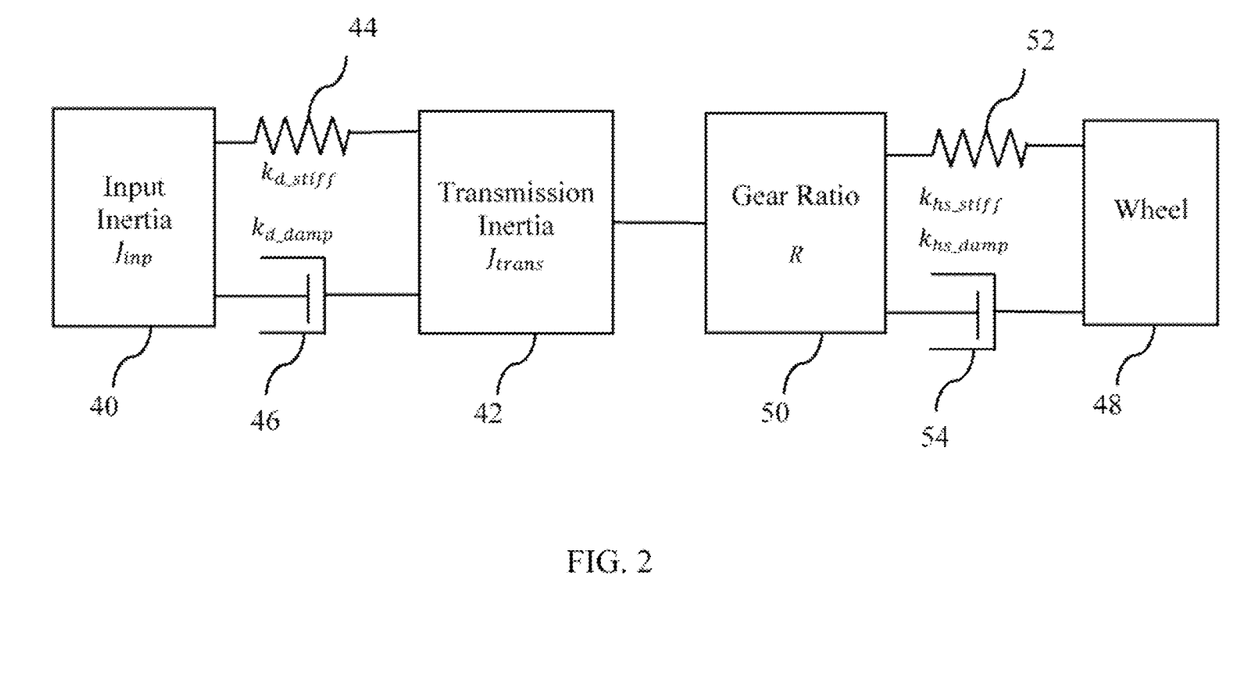
FIG. 2 is a schematic diagram of a powertrain dynamic model consistent with the vehicle powertrain of FIG. 1.

The method is based on the system model illustrated in FIG. 2. This model includes two rotational inertias: input inertia 40 and transmission inertia 42. The input inertia includes the inertia of the engine crankshaft (and elements that move with it) and portions of the transmission that are upstream of the damper, such as the torque converter impeller. The transmission inertia includes the inertia of rotating elements downstream of the damper and upstream of the halfshafts. The inertia of elements that rotate at a different speed than the transmission input are reflected to the transmission input by multiplying their base inertia by the square of the speed ratio. As such, the transmission inertia may differ depending upon which transmission gear ratio is presently established. Input inertia 40 is connected to transmission inertia 42 by spring element 44 and by dashpot element 46. The spring element transmits torque proportional to the difference in rotational displacement of the two inertias times the spring constant $k_{d\_stiff}$. The dashpot element transmits a torque proportional to the first derivative of this difference times the constant $k_{d\_damp}$. A spring connection stores energy and returns it to the system. A dashpot connection, by contrast, dissipates system energy. The transmission inertia 42 is connected to the wheels 48 via a gear ratio 50, spring element 52, and dashpot element 54.

Figure 3:
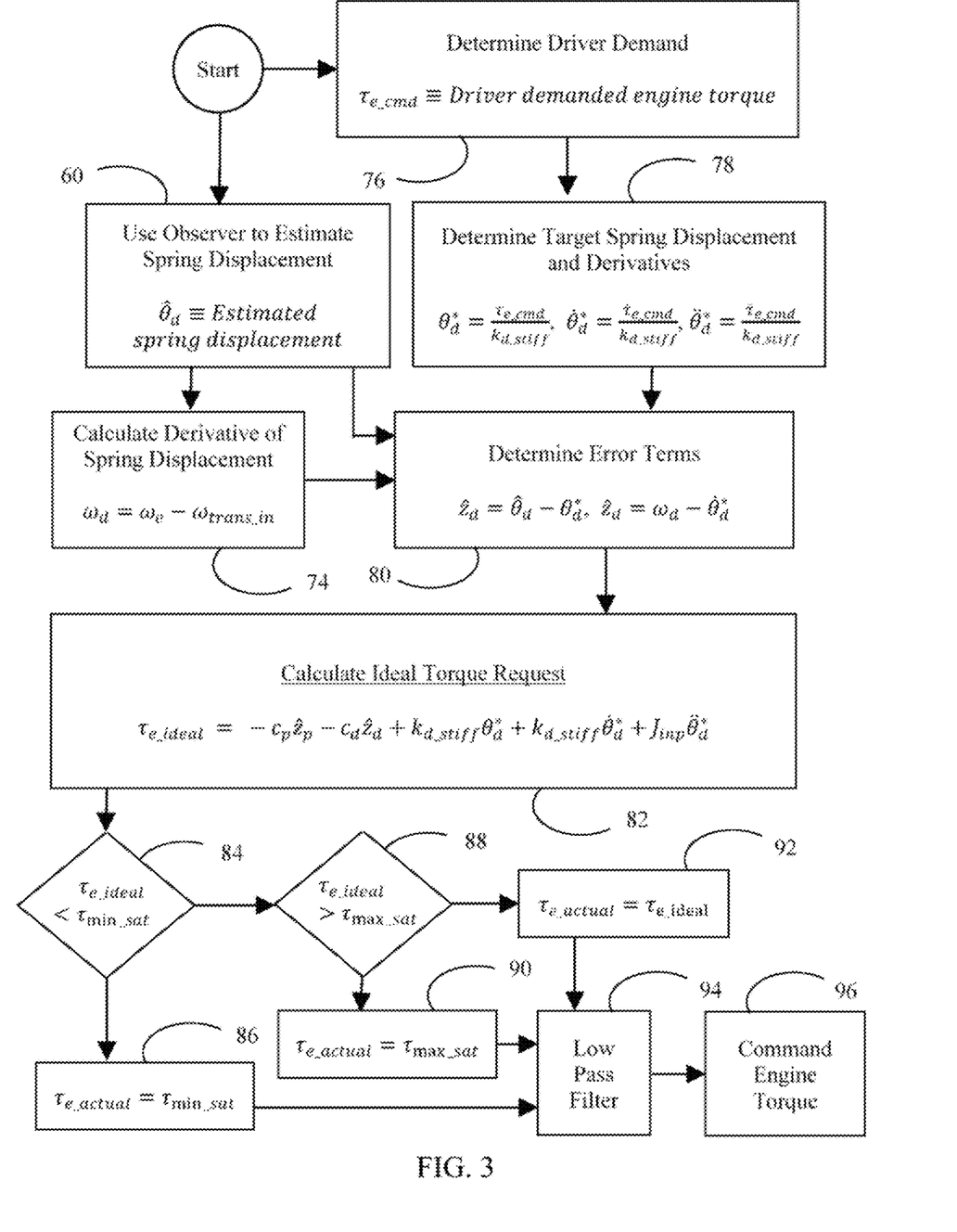
FIG. 3 is a flowchart illustrating a method of controlling the powertrain of FIG. 1 to reduce a shuffle oscillation.
Figure 4:
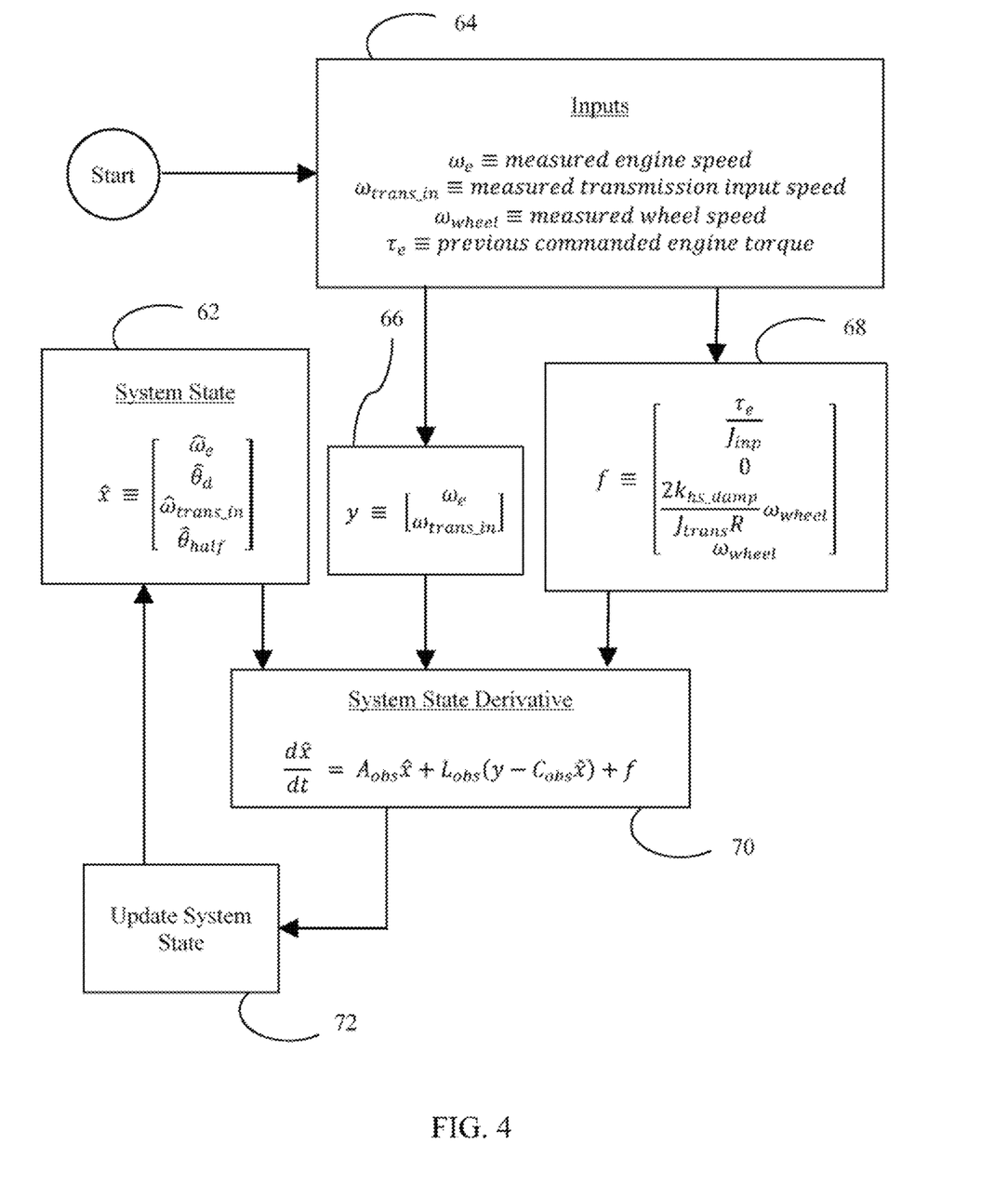
FIG. 4 is a flowchart illustrating a sub-method of the method of FIG. 3 for estimating a current damper displacement.

A method to control engine torque to mitigate shuffle is illustrated by the flowcharts of FIGS. 3 and 4. The main control routine is illustrated in FIG. 3. At 60, the main control routine calls the observer routine, illustrated in FIG. 4, to obtain an estimate of the damper spring displacement. Referring to FIG. 4, the observer routine updates a state vector consisting of estimates of engine speed, $\hat{\omega}_e$, damper displacement, $\hat{\theta}_d$, transmission input speed, $\hat{\omega}_{trans\_in}$, and half-shaft windup, $\hat{\theta}_{half}$ as shown at 62. At 64, the controller collects the necessary inputs, namely, the speeds as determined by sensors 30, 32, and 34 and the engine torque as computed in the previous time step. At 66, the controller forms a correction vector, y, consisting of the measured inputs which directly correspond to estimates in the state vector. Specifically, the y vector includes the measured engine (crankshaft) speed, $\omega_e$, and the measured transmission input shaft speed, $\omega_{trans\_in}$. At 68, the controller forms a second vector, f, based on inputs that impact the derivatives of the model variables that are estimated in the state vector. Specifically, the f vector includes the previously commanded engine torque, $\tau_e$, and the measured wheel speed, $\omega_{wheel}$, multiplied by appropriate constants. At 70, the controller calculates the derivatives of each element in the state vector using the vector equation $$\frac{d\hat{x}}{dt} = A_{obs}\hat{x} + L_{obs}(y - C_{obs}\hat{x}) + f.$$

The constant matrix $A_{obs}$ reflects the system model illustrated in FIG. 2. Specifically, $$A_{obs} = \begin{bmatrix} \frac{-k_{d\_damp}}{J_{inp}} & \frac{-k_{d\_stiff}}{J_{inp}} & \frac{k_{d\_damp}}{J_{inp}} & 0 \\ 1 & 0 & -1 & 0 \\ \frac{k_{d\_damp}}{J_{trans}} & \frac{k_{d\_stiff}}{J_{trans}} & \frac{-\left(k_{d\_damp} + \frac{2k_{hs\_damp}}{(R)^2}\right)}{J_{trans}} & \frac{-2(R)^2 k_{hs\_stiff}}{J_{trans}R} \\ 0 & 0 & \frac{1}{(R)} & 0 \end{bmatrix}.$$

The constant matrices $C_{obs}$ and $L_{obs}$ ensure that the estimates of the engine speed and the transmission input shaft speed tend toward the measured values. Specifically, $$C_{obs} = \begin{bmatrix} 1 & 0 & 0 & 0 \\ 0 & 0 & 1 & 0 \end{bmatrix}$$

and $L_{obs}$ is selected such that $A_{obs} - L_{obs}C_{obs}$ is stable.

At 72, the updated system state vector is calculated based on the previous system state vector and the derivative vector. The previous system state vector is incremented by a constant multiplied by the derivative vector wherein the constant is determined based on the duration since the previous update.

Returning to FIG. 3, at 74, the controller calculates the derivative of the damper spring displacement based on the measured engine and transmission input speeds. Alternatively, the derivative of the damper spring could be taken from step 70 of the flow chart of FIG. 4. At 76, the controller determines the driver demanded engine torque. At 78, the controller calculates target spring displacements and first and second derivatives. These targets are selected such that the transmission input torque would match the driver demand. At 80, the controller calculates error terms by comparing the estimated spring displacement and its derivative to the targets.

At 82, the controller calculates the ideal engine torque request, unconstrained by the engine capability. The first term, $-c_p\hat{z}_p$, is called the proportional term because it is proportional to the spring displacement error. The constant $c_p$ is a calibratable value selected to improve the experience of vehicle occupants following excitation of the shuffle mode. A higher value will reduce the oscillation more rapidly, but results in greater variation in engine torque. The second term, $-c_d\hat{z}_d$, is called the derivative term because it is proportional to the spring displacement derivative error. The constant $c_d$ is another calibratable value selected to improve the experience of vehicle occupants following excitation of the shuffle mode. A higher value will reduce the oscillation more rapidly, but results in greater variation in engine torque. The remaining three terms are feedforward terms based calculated to make the transmission input torque track the driver demanded torque as closely as possible. In an implementation, the equations of boxes 74, 78, 80, and 82 may be algebraically re-arranged to simplify the computations.

In steps 84-90, the ideal torque request is clipped to the extent necessary based on responsiveness limitations of the engine. The range of torque capability at the next time step is based on the present torque and a maximum rate of change, which may be different for increasing torque and decreasing torque. For example, some engines may be able to reduce torque quickly by adjusting spark timing but unable to increase torque as quickly. At 84, The ideal torque request is compared to the minimum torque that the engine can produce at the next time step. If the ideal torque request is less than the minimum, then the actual torque request is set to the minimum available at 86. Otherwise, at 88, The ideal torque request is compared to the maximum torque that the engine can produce at the next time step. If the ideal torque request is greater than the maximum, then the actual torque request is set to the maximum available at 90. Otherwise, the actual torque request is set to the ideal torque request. At 94, the actual torque request is passed through a low pass filter which reduces noise. Finally, at 96, the engine is commanded to produce the calculated torque.

Figure 5:
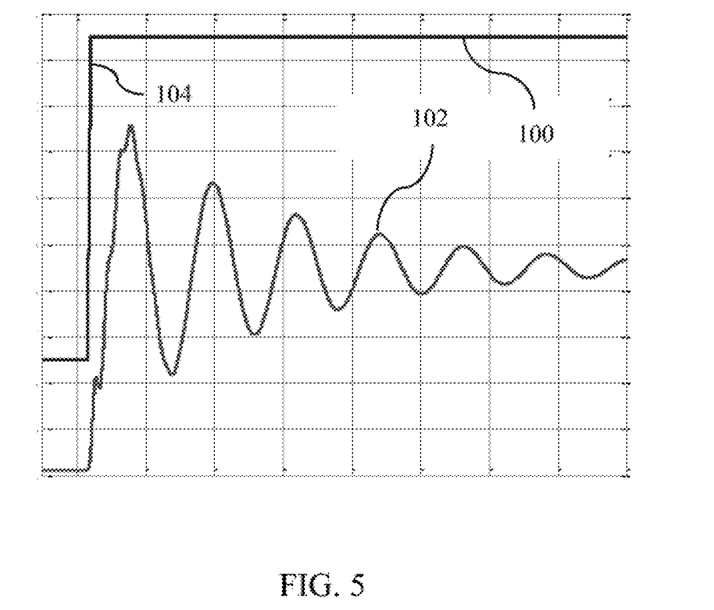
FIG. 5 is a graph of engine torque and spring displacement vs. time for a shuffle event without active engine torque based anti-shuffle control.
Figure 6:
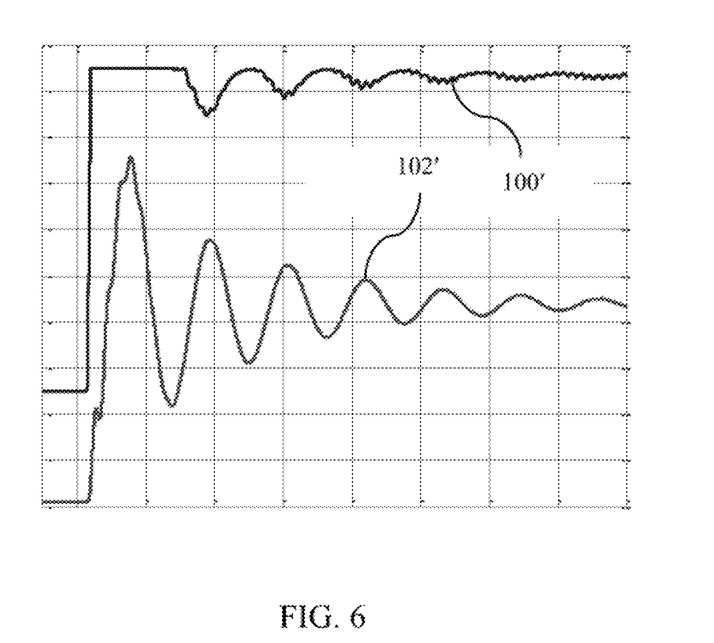
FIG. 6 is a graph of engine torque and spring displacement vs. time for a shuffle event with active engine torque based anti-shuffle control using a derivative term but no proportional term.
Figure 7:
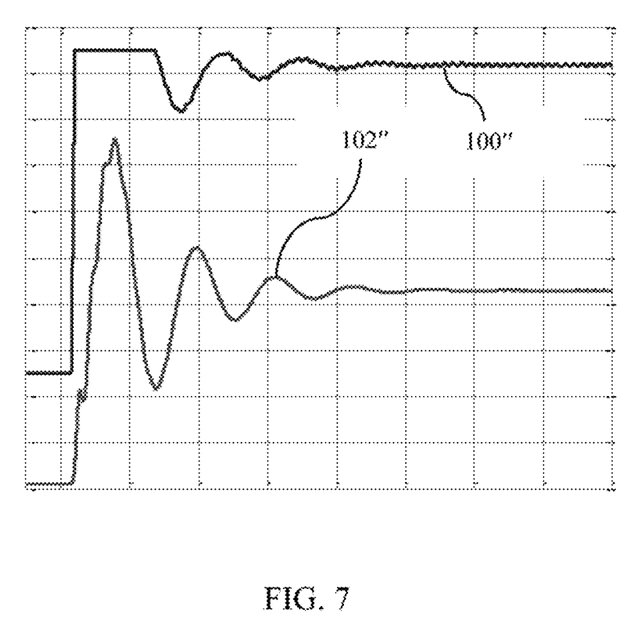
FIG. 7 is a graph of engine torque and spring displacement vs. time for a shuffle event with active engine torque based anti-shuffle control using both a derivative term and a proportional term.

The effectiveness of the above shuffle control method is illustrated in FIGS. 5-7. FIG. 5 is a time plot of the engine torque request 100 and the damper spring displacement 102 with no shuffle control implemented. The engine torque requests increases rapidly at 104 triggering the shuffle oscillation. Since no shuffle control is implemented, the engine torque remains steady at the increased level. The damper spring displacement increases beyond the steady state level and then oscillates around the steady state level. The oscillations gradually decrease in amplitude due to mechanical (passive) damping in the system.

FIG. 6 is a time plot illustrating a shuffle control algorithm with a d-term but no p-term. Note that after the oscillation begins, the engine torque request 100' varies 180 degree out of phase with the damper displacement 102'. In other words, the minimum engine torque request corresponds in time with the maximum damper displacement. Comparing FIG. 6 to FIG. 5, note that the d-term causes the oscillation magnitude of the damper displacement to decrease slightly more rapidly.

FIG. 7 is a time plot illustrating a shuffle control algorithm with both a d-term and a p-term. Note that the phase difference between damper displacement 102" and the engine torque request 100" is between 90 and 180 degrees. In other words, the engine torque request reaches a minimum between the time the damper displacement reaches a minimum and the time the damper displacement reaches the next maximum, but closer to the later. Comparing FIG. 7 to FIG. 6, note that the addition of the p-term causes the oscillation to dissipate considerably more rapidly, without substantially increasing the magnitude of the engine torque variation from nominal.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A method of controlling a powertrain comprising:
   transmitting power from a powerplant to vehicle wheels via a transmission wherein a transmission input shaft is coupled to a powerplant shaft by a torsion damper having a spring and a transmission output shaft is driveably connected to vehicle wheels by a driveline;
   based on a time series of past measured rotational velocities of the powerplant shaft, the transmission input shaft, and the vehicle wheels, and a time series of past powerplant torque values, calculating an estimated current displacement of the spring;
   calculating an estimated current rate of change of spring displacement; and
   adjusting a current powerplant torque based on (i) the estimated current displacement of the spring and (ii) the estimated current rate of change of spring displacement to reduce a spring displacement oscillation.

2. The method of claim 1 further comprising:
   further adjusting the current powerplant torque based on a driver demanded torque and a derivative of the driver demanded torque.

3. The method of claim 1 wherein the powerplant is an internal combustion engine and the powerplant shaft is a crankshaft.

4. A powertrain comprising:
   a gearbox having an input shaft connected to an engine crankshaft by a damper having a spring; and
   a controller programmed to, based on a time series of past speed sensor readings and a time series of past engine torque values, command the engine to produce an engine torque that oscillates between 90 degrees and 180 out of phase with a displacement of the spring.

5. The powertrain of claim 4 wherein the gearbox has an output shaft driveably connected to vehicle wheels.

6. The powertrain of claim 5 wherein the speed sensor readings consist of:
   a sensed crankshaft speed reading;
   a sensed input shaft speed reading; and
   a sensed wheel speed reading.

7. The powertrain of claim 4 wherein the controller is further programmed to calculate a current estimated spring displacement based on the time series of past speed sensor readings and the time series of past engine torque values.

8. The powertrain of claim 7 wherein the controller is further programmed to calculate a target engine torque command comprising a p-term proportional to the current estimated spring displacement.

9. The powertrain of claim 8 wherein the target engine torque command further comprises a d-term proportional to a speed difference between the engine crankshaft and the input shaft.

10. The powertrain of claim 8 wherein the target engine torque command further comprises a feed forward term based on a driver demanded torque.

11. A powertrain comprising:
    a gearbox having an input shaft connected to an engine crankshaft by a damper having a spring;
    a sensor array not including any sensors configured to measure spring displacement; and
    a controller programmed to, based exclusively on readings from the sensor array and past engine torque values, command the engine to produce an engine torque that oscillates between 90 degrees and 180 out of phase with a displacement of the spring.

12. The powertrain of claim 11 wherein the gearbox has an output shaft driveably connected to vehicle wheels.

13. The powertrain of claim 12 wherein the sensor array comprises:
    a crankshaft speed sensor;
    an input shaft speed sensor; and
    a wheel speed sensor.

14. The powertrain of claim 11 wherein the controller is further programmed to calculate a current estimated spring displacement based on the readings from the sensor array and the past engine torque values.

15. The powertrain of claim 14 wherein the controller is further programmed to calculate a target engine torque command comprising a p-term proportional to the current estimated spring displacement.

16. The powertrain of claim 15 wherein the target engine torque command further comprises a d-term proportional to a speed difference between the engine crankshaft and the input shaft.

17. The powertrain of claim 15 wherein the target engine torque command further comprises a feed forward term based on a driver demanded torque.

* * * * *